C. F. JENKINS.
MOTION PICTURE MIRROR OF CYLINDRICAL TYPE.
APPLICATION FILED FEB. 5, 1921.

1,413,333.

Patented Apr. 18, 1922.
2 SHEETS—SHEET 1.

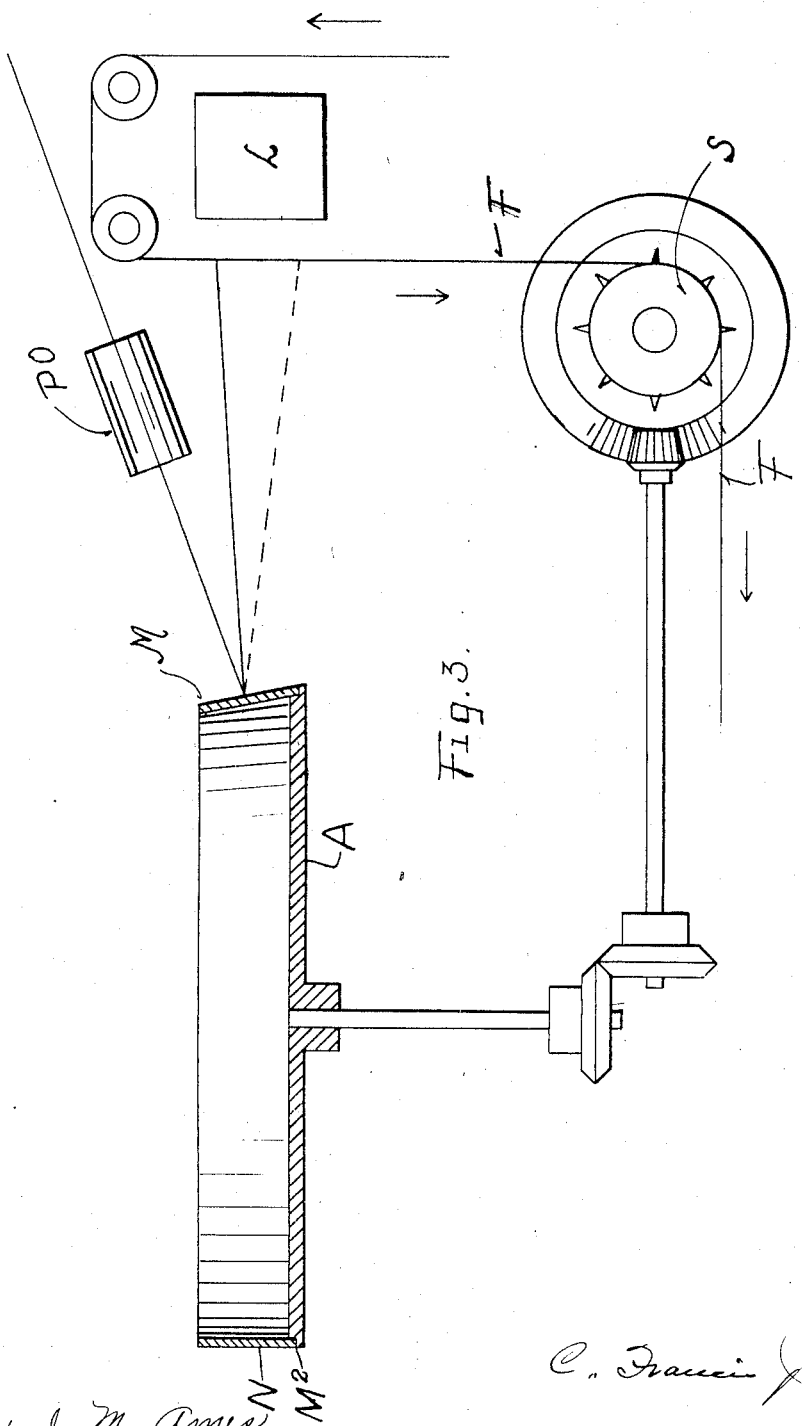

UNITED STATES PATENT OFFICE.

CHARLES FRANCIS JENKINS, OF WASHINGTON, DISTRICT OF COLUMBIA, ASSIGNOR TO DISCROLA, INC., OF WASHINGTON, DISTRICT OF COLUMBIA, A CORPORATION.

MOTION-PICTURE MIRROR OF CYLINDRICAL TYPE.

1,413,333. Specification of Letters Patent. Patented Apr. 18, 1922.

Application filed February 5, 1921. Serial No. 442,871.

*To all whom it may concern:*

Be it known that I, CHARLES FRANCIS JENKINS, a citizen of the United States, and resident of Washington, in the District of Columbia, have invented certain new and useful Improvements in Motion-Picture Mirrors of Cylindrical Type, of which the following is a specification, reference being had therein to the accompanying drawing.

This invention relates to warped mirrors usable in motion picture machines or wherever a moving object should be shown in a fixed position. The general object is to provide a light, simple, nearly noiseless, high speed machine using a mirror type instead of a lens or prism type, the prism effect being produced by using a warped or twisted mirror.

In the accompanying drawings,

Fig. 3 shows diagrammatically a mirror and motion picture devices used therewith.

Figure 1:
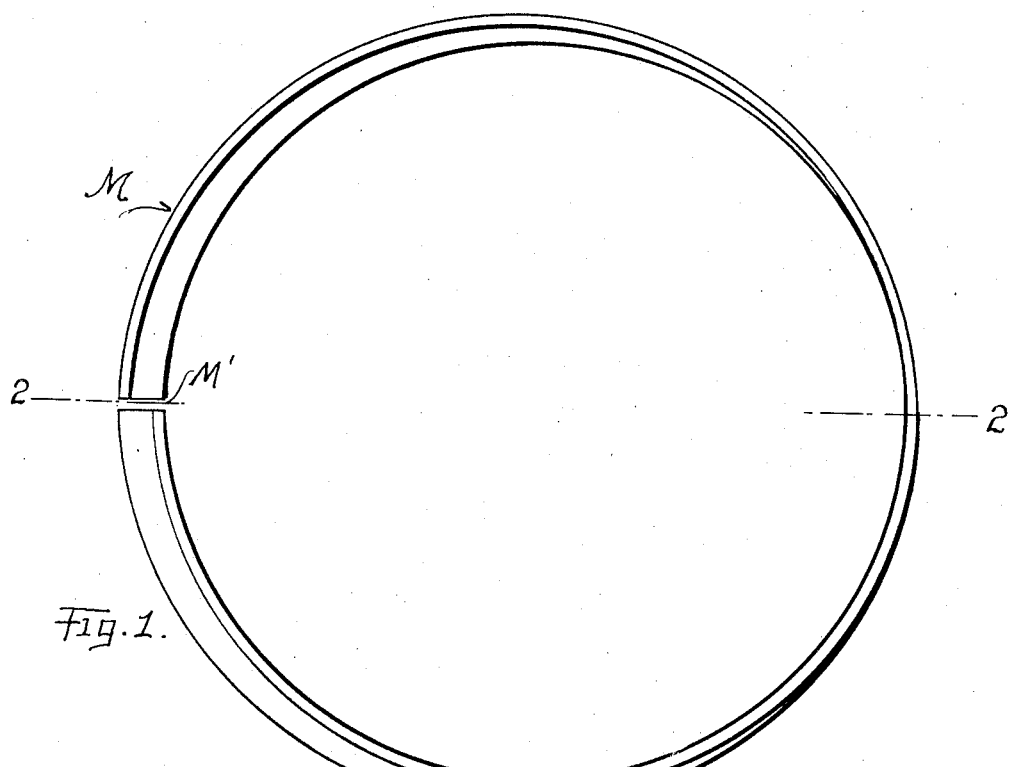
Fig. 1 is a side view of an approximately cylindrical mirror which embodies the leading idea of this inventiton.
Figure 2:
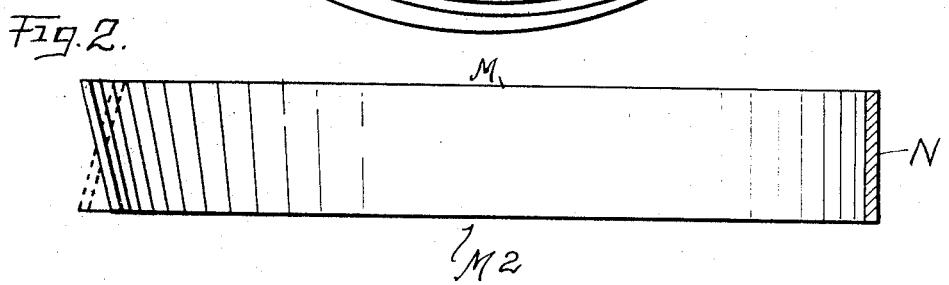
Fig. 2 is a section on the line 2—2, Fig. 1.

In these figures, A represents a plane disk rotated by common gearing, and F a picture film constantly fed past a source L of light by a sprocket drum S rotated at a speed having a predetermined relation to the speed or rotation of the disk A. An approximately cylindrical or sleeve-like mirror has its plane lower edge $M^2$ fixed to the disk A with its cylindrical axis perpendicular to the disk and further has, as shown, in this instance its upper margin M in a plane parallel to the disk. The mirror is divided at M' and the ends thus formed are made to incline oppositely with respect to the cylinder's axis the sleeve wall being twisted or bent in such manner that in passing around the sleeve from the point of division, the inclination of that wall decreases progressively until a point N is reached, where the wall is parallel to the axis of the cylinder. In continuing around the sleeve in the same direction, the wall is progressively inclined in an opposite direction until the point M' is again reached, and here the two ends are equally but oppositely inclined.

The speed of the film and of the rotation of the disk are in this instance such that the sleeve makes a complete revolution while the film advances a picture's width, and during this interval light from the source L strikes the mirror and is reflected in the axial line of a projecting lens PO.

As a given point on the film advances the ray therefrom would be reflected in a constantly varying direction were the mirror fixed, but as the mirror rotates its angle progressively varies at exactly the relative rate needed to compensate the advance of the point, the result being that the ray after reflection maintains a fixed direction and the image of that point remains fixed on the screen,—not shown. What is true of that point is true of all points of the picture.

When the mirror has completed a revolution and a second picture is about to be presented, the rotation of the mirror suddenly changes the inclination, the end just reached at the point M' being replaced by the opposite end, bringing the parts to initial position,—when the entire operation is repeated, and so on, at any desired speed.

It is understood that similar devices may, without invention, be employed in a camera or other optical apparatus where it may be desired to produce analogous results.

Obviously, it is not essential that the mirror be divided at M' since by well known means the parts of the mirror may be properly off-set without being cut.

What I claim is:

1. An approximately cylindrical mirror in which one end margin progressively varies in distance from the cylindrical axis.

2. An approximately cylindrical motion picture mirror in which both end margins vary progressively but oppositely, in passing around the cylinder, in distance from the axis of the cylinder.

3. The combination with a sleeve-like mirror having its margins, in passing around the axis of the cylinder, varied progressively and oppositely in distance from that axis, of means for directing rays of light to the reflecting surface, means for passing picture film continuously across said rays at a given rate, and means for continuously rotating the mirror about its axis at a rate having a predetermined relation to the rate of the film.

In testimony whereof I hereunto affix my signature.

CHARLES FRANCIS JENKINS.